(12) United States Patent
Vigars et al.

(10) Patent No.: US 9,845,785 B2
(45) Date of Patent: Dec. 19, 2017

(54) CONNECTION SYSTEMS (71) Applicant: TIDAL GENERATION LIMITED, Stafford (GB)

(72) Inventors: Paul Vigars, Bristol (GB); Christopher Germain, Bristol (GB); Daniel Haworth, Cambridge (GB); Richard Goss, Totnes (GB)

(73) Assignee: Tidal Generation Limited, Stafford (GB)

( * ) Notice: Subject to any disclaimer, the term of this patent is extended or adjusted under 35 U.S.C. 154(b) by 311 days.

(21) Appl. No.: 14/404,817

(22) PCT Filed: May 23, 2013

(86) PCT No.: PCT/GB2013/051356
§ 371 (c)(1),
(2) Date: Dec. 1, 2014

(87) PCT Pub. No.: WO2013/178996
PCT Pub. Date: Dec. 5, 2013

(65) Prior Publication Data
US 2015/0152834 A1  Jun. 4, 2015

(30) Foreign Application Priority Data
Jun. 1, 2012 (GB) .................... 1209788.7

(51) Int. Cl.
*F03B 13/10* (2006.01)
*F03B 13/26* (2006.01)
*H01R 35/02* (2006.01)

(52) U.S. Cl.
CPC ............ *F03B 13/10* (2013.01); *F03B 13/264* (2013.01); *H01R 35/02* (2013.01); *Y02E 10/28* (2013.01); *Y10T 403/32057* (2015.01)

(58) Field of Classification Search
CPC ....... F03B 13/10; F03B 13/264; H02G 11/00; H01R 35/00; H01R 35/04; H01R 35/025;
(Continued)

(56) References Cited

U.S. PATENT DOCUMENTS

| 4,114,043 A | 9/1978 | Gansfried |
| 5,195,388 A * | 3/1993 | Zona .......................... B25J 9/08 |
| | | 310/71 |

(Continued)

FOREIGN PATENT DOCUMENTS

| GB | 2 164 506 A | 3/1986 |
| GB | 2 269 487 A | 2/1994 |

(Continued)

OTHER PUBLICATIONS

Search Report issued in British Patent Application No. 1209788.7 dated Oct. 9, 2012.
(Continued)

*Primary Examiner* — Michael P Ferguson
(74) *Attorney, Agent, or Firm* — Dority & Manning, P.A.

(57) ABSTRACT

A connection system for connecting a first connection point with a second connection point, the second connection point being arranged for rotation and translation with respect to the first connection point, the connection system includes a first connection point, a first support surface moveable linearly with respect to the first connection point, a second support surface moveable linearly and rotationally with respect to the first connection point, and a second connection point moveable linearly and rotationally with respect to the first connection point, moveable rotationally with respect to the first support surface, and fixed with respect to the second support surface, and a reverse bend radius cable chain located on the first and second support surfaces, and having a first end connected with the first connection point via a first (Continued)

connector cable, and a second end connected with the second connection point via a second connector cable.

14 Claims, 8 Drawing Sheets

(58) Field of Classification Search
CPC ..... Y10T 403/32057; Y10T 403/32008; Y10T 403/32041; B25J 19/0029
See application file for complete search history.

(56) References Cited

U.S. PATENT DOCUMENTS

| | | | |
|---|---|---|---|
| 5,384,431 A | 1/1995 | Tusques | |
| 7,464,623 B2 * | 12/2008 | Okada | B25J 19/0029 74/490.05 |
| 8,414,303 B2 * | 4/2013 | Nakamura | B25J 19/0029 439/15 |
| 8,858,236 B2 * | 10/2014 | Richard | H01R 39/64 439/21 |
| 8,920,200 B2 * | 12/2014 | Blaxland | F03B 13/10 439/848 |
| 2010/0313694 A1 * | 12/2010 | Aoki | B25J 19/0029 74/490.02 |

FOREIGN PATENT DOCUMENTS

| | | |
|---|---|---|
| GB | 2 431 207 A | 4/2007 |
| WO | WO 86/04463 | 7/1986 |
| WO | WO 93/23903 | 11/1993 |

OTHER PUBLICATIONS

International Search Report issued in International Patent Application No. PCT/GB2013/051356 dated Jul. 22, 2013.
International Written Opinion issued in International Patent Application No. PCT/GB2013/051356 dated Jul. 22, 2013.

* cited by examiner

CONNECTION SYSTEMS

The present invention relates to connection systems and, in particular, to connection systems for enabling rotation of one connector with respect to another.

BACKGROUND OF THE INVENTION

Connection systems are used to connect electrical cables, optical cables, hydraulic lines or other flexible cables between first and second end points that are able to rotate with respect to one another. Typically, a flexible cable is carried within a reverse bend radius chain that supports and guides the cable whilst the end points rotate with respect to one another. Such reverse bend radius chains enable rotation of greater than 360 degrees to be achieved. However, such chain based systems are designed to operate in a single plane, and are not able to deal with linear movement of the end points out of that plane of operation. Some example rotary reverse bend radius chains are produced by IGUS GMBH.

Figure 1:
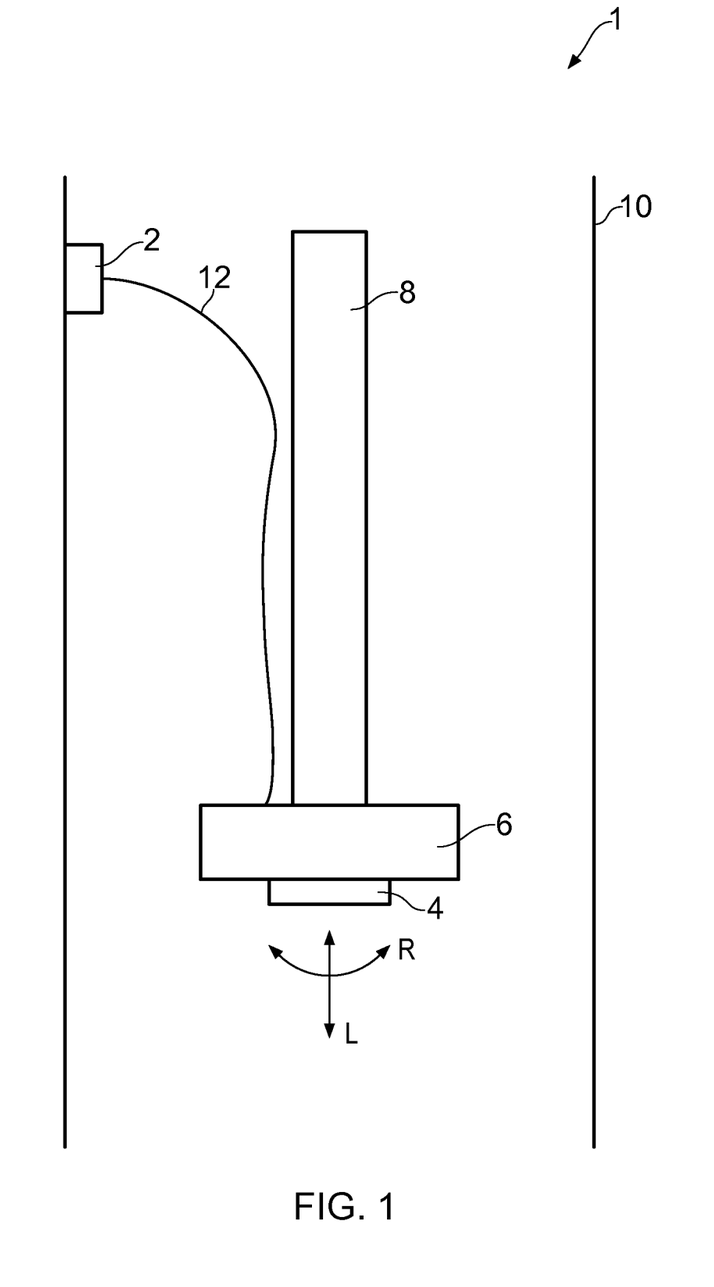
FIG. 1 is a schematic view of a previously considered connection system.

An example of dealing with relative linear movement of the end points is illustrated in FIG. 1 of the accompanying drawings. A connector system 1 has a first connector 2 and a second connector 4, and is provided within a housing 10. The second connector 4 is mounted on a connector carrier 6 which itself is mounted on a shaft 8. The shaft 8, and hence connector carrier 6, is mounted for rotational movement R and linear movement L, with respect to the housing and first connector 2. A flexible cable 12 is provided to connect the first connector 2 to the second connector 4. As the shaft 8 moves linearly within the housing 10, the cable 12 curls and uncurls within the housing to enable the connection to be maintained. As the shaft rotates, the cable 12 then curls around the shaft 8. However, such a system is prone to cable snagging, and over bending.

Figure 2:
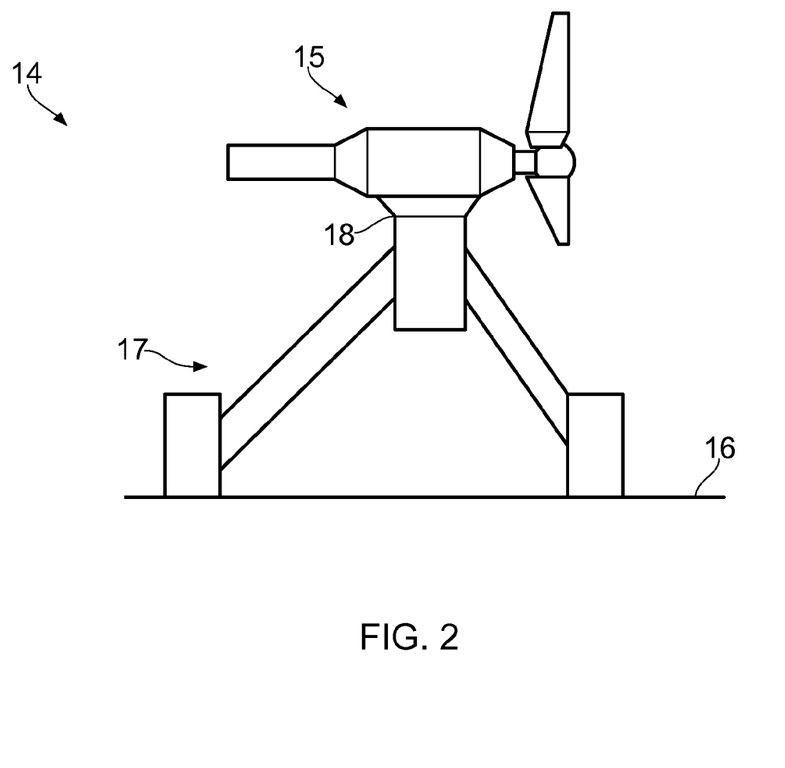
FIG. 2 illustrates a subsea electricity generating device.

In particular, the system of FIG. 1 is not suitable for subsea applications, for example, for a water stream power generating device such as that shown in FIG. 2. Such a device 14 comprises a turbine unit 15 mounted on the seabed 16 on a support structure 17. An engagement system 18 is provided that enables the turbine unit 15 to be attached releasably to the support structure 17. In the example shown in FIG. 2, the turbine unit 15 is rotatable about a vertical axis with respect to the support structure 17, and so electrical and/or hydraulic and/or control connections between the turbine unit 15 and the support structure 17 must be able to deal with rotation of the turbine unit 15. In addition, the turbine unit 15 is releasably engagable with the support structure 17, such that the unit 15 may be removed along the vertical axis from the support structure 17. The connections between the unit 15 and the support structure 17 can be made after the unit has been located on the support structure. In such a case, the connectors must be able to move axially within the engagement system, whilst maintaining the ability to rotate within the engagement system. In one example, the unit 15 is located on the support structure 17, and the connectors are rotated for polar alignment. The connectors are then moved axially towards the support structure to engage with corresponding connectors therein. The connection system then is able to allow the unit 15 to rotate with respect to the support structure. It will be appreciated that the connector alignment and engagement system may be provided on the support structure, or split appropriately between the support structure 17 and the unit 15 Thus, it is desirable to provide a connection system to enable electrical, hydraulic, optical, control and/or other connections to be made between the turbine unit 15 and the support structure 17, whilst allowing for rotation and linear movement of the connectors within the engagement system.

SUMMARY OF THE INVENTION

According to one aspect of the present invention, there is provided a connection system for connecting a first connection point with a second connection point, the second connection point being arranged for rotation and translation with respect to the first connection point, the connection system comprising a first connection point, a first support surface moveable linearly with respect to the first connection point, a second support surface moveable linearly and rotationally with respect to the first connection point, a second connection point moveable linearly and rotationally with respect to the first connection point, and moveable rotationally with respect to the first support surface, and fixed with respect to the second support surface, and a reverse bend radius cable chain located on the first and second support surfaces, and having a first end connected with the first connection point via a first connector cable, and a second end connected with the second connection point via a second connector cable.

One example of such a connection system comprises a cable carrier having a surface which provides the first support surface, a substantially circular member having a surface which provides the second support surface, wherein the substantially circular member is arranged radially inside the cable carrier such that the first support surface is adjacent the second support surface.

In one example, the cable carrier is provided by a substantially annular member.

In one example, the cable carrier extends only partially around the substantially circular member.

In one example, the first support surface extends only partially around the second support surface.

In one example, the second connection point is mounted on the substantially circular member.

In one example, the cable carrier is attached to the substantially circular member such that linear movement between the cable carrier and substantially circular member is substantially prevented, and such that the substantially circular member is rotatable with respect to the cable carrier.

One example of such a connection system comprises a housing in which the cable carrier and substantially circular member are located, the cable carrier being attached to the housing to allow linear movement of the cable carrier with respect to the housing and substantially to prevent rotational movement of the cable carrier with respect to the housing.

One example of such a connection system comprises at least one guide rail located on an inner surface of the housing, and at least one guide member associated with the or each guide rail, each guide member being arrange to attach the cable carrier with a guide rail.

One example of such a connection system comprises at least one elongate guide portion which extends from the housing and which slidably engages with a guide aperture in the cable carrier.

In one example, the first connection point provides a functional connection. In one example, the first connection point provides a physical connection. In one example, the second connection point provides a functional connection. In one example, the second connection point provides a physical connection.

According to another aspect of the present invention, there is provided a An underwater power generating device comprising a connection system in accordance with the first aspect of the present invention.

One example of such a device comprises support structure for location on the bed of a body of water, and a power generating unit adapted for mounting on the support structure the power generating unit being adapted for rotation with respect to the support structure, the connection system being arranged to provide at least one connection between equipment of the support structure and equipment of the power generating unit.

One example of such a device further comprises an engagement system adapted to enable the power generating unit to be rotated with respect to the support structure and detached from the support structure, the connection system being located substantially within the engagement system.

DETAILED DESCRIPTION OF THE PREFERRED EMBODIMENTS

Figure 3:
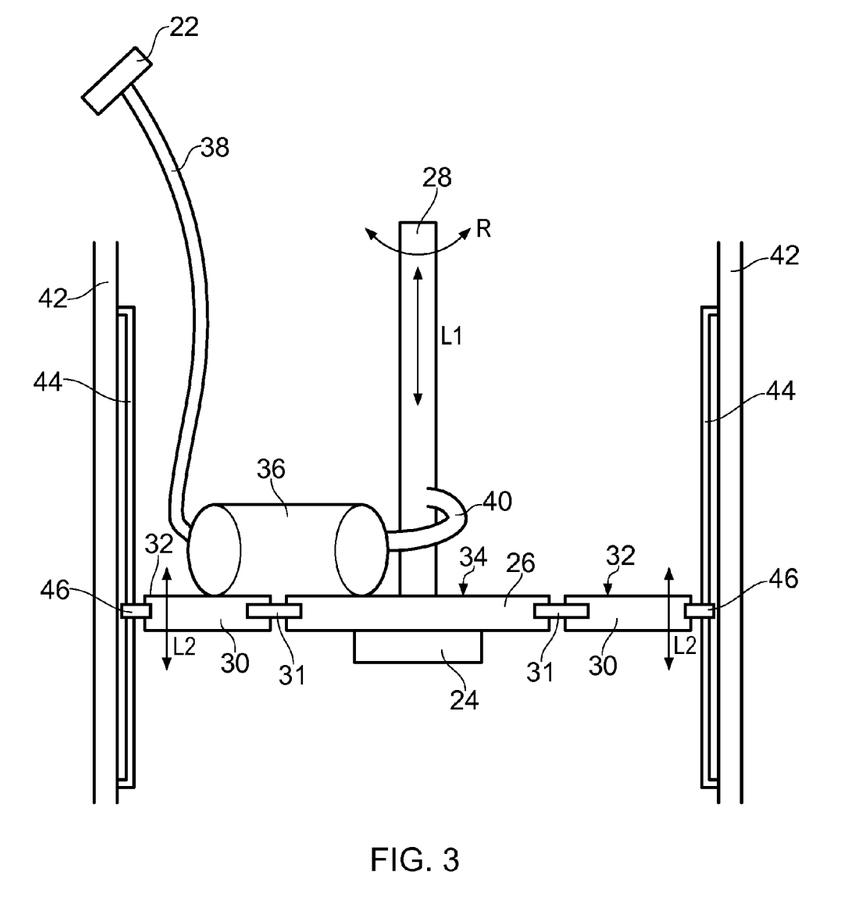
FIG. 3 illustrates a side cross-sectional view of a connection system embodying one aspect of the present invention.
Figure 4:
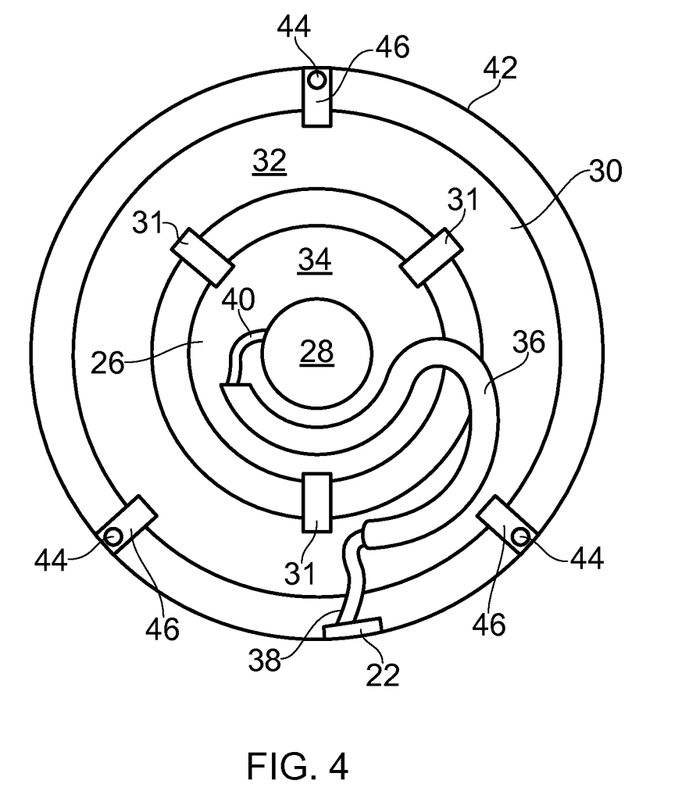
FIG. 4 is a plan view of the system of FIG. 3.

FIG. 3 illustrates, in side view, a connection system 20 embodying one aspect of the present invention. FIG. 4 illustrates the system of FIG. 3 in plan view. The connection system 20 comprises a first connection point 22 and a second connection point 24. The second connection point 24 is arranged for rotational movement R and linear movement L1 with respect to the first connection point 22. The second connection point 24 is carried on a connector carrier 26 which itself is mounted on a shaft 28. The shaft 28 is mounted (details of the mounting not shown for clarity) within a housing 42. The housing 42 may be provided by a specific connection system housing, or by a portion of the equipment to which the connection system is applied.

The first and second connection points 22 and 24 may provide electrical, hydraulic, control or other functional connections, or may simply provide fixing points or other points of reference for the cable being routed through the connection system. It will be readily appreciated that any appropriate number of connection points may be provided of any appropriate type.

In the example shown in FIGS. 3 and 4, the connector carrier 26 is provided by a circular, or near circular disc having a first surface on which the second connection point 24 is mounted.

A cable carrier 30 is arranged between an outer edge of the connector carrier 26 and the inner surface of the housing 42, and in the example shown in FIGS. 3 and 4 is provided by a circular annular member. The cable carrier is attached to the connector carrier 26 by way of attachment portions 31. In FIG. 4, three attachment portions 31 are shown, but it will be appreciated that any particular number of attachment portions 31 may be provided. The attachment portions 31 ensure that the cable carrier 30 is able to move in a linear direction L2 as the connector carrier 26 moves in a linear direction L1. The attachment portions 31 also allow the connector carrier 26 to rotate with respect to the cable carrier 30. Hence the connector carrier 26 is able to rotate with respect to the housing 42, while the cable carrier 30 does not rotate with respect to the housing 42.

The cable carrier 30 is restrained from such rotational movement by a number of guide rails 44 which extend along the inner surface of the housing 42. Guide members 46 attach the cable carrier 30 to the guide rails 44, so that the cable carrier is able to move linearly within the housing 42, but is prevented from rotating within the housing 42. Once again, three guide rails and associated guide members are shown in FIGS. 3 and 4, but it will be readily appreciated that any appropriate number of guide rails and guide members may be provided. It will also be appreciated that any appropriate means for preventing rotation of the cable carrier may be provided.

The provision of the connector carrier and separate cable carrier 30, enables the cable carrier 30 to move linearly with the connector carrier 26, whilst allowing the connector carrier 26 to rotate with respect to the cable carrier 30.

The connector carrier 26 provides a first support surface and a second support surface 34. The cable carrier 30 provides a first support surface 32 and the connector carrier 26 provides a second support surface 34. A reverse bend radius chain 36 in which at least one cable is routed, is located on the first and second support surfaces 34 and 32. The cable routed through the chain 36 is connected to the first connection point 22 by way of a first connecting cable 38, and to the second connection point 24 by way of a second connecting cable 40. A reverse bend radius chain 36 enables the connection between the first and second connection points 22 and 24 to be maintained as the connector carrier 26 rotates with respect to the housing 42 and first connection point 22.

For example, the connector carrier 26 may be driven to rotate with respect to the housing by a suitable drive mechanism. Alternatively, it may be the housing that rotates with respect to the connector carrier 26, for example when the turbine unit is rotated on the support structure.

The provision of the cable carrier 30 with its first support surface 32, on which another portion of the reverse bend radius chain 36 is supported, means that friction of movement of the chain 36 is reduced. This is the case because the chain 36 has most of its length stationary with respect to its support surface, whether that be the first surface 32 or the second surface 34, and has only a small portion of its length in transition between the two surfaces, as the first support surface 32 rotates with respect to the second support surface 34.

The cable carrier 30, which does not rotate with respect to the housing 42 or first connection point 22, enables the first connection cable 38 to remain static rotationally, thereby preventing this cable from being entangled. Similarly, the inner end of the chain 36, which is supported on the second support surface 34 of the connector carrier 26, is stationary with respect to the carrier 36 and second connection point 24, such that the second connecting cable 40 does not translate or rotate, thereby preventing this cable from tangling.

In such a manner, the connector carrier 26 is able to rotate by more than 360° with respect to the housing and first connection point 22, and the whole assembly is able to translate within the housing 42.

Figure 5:
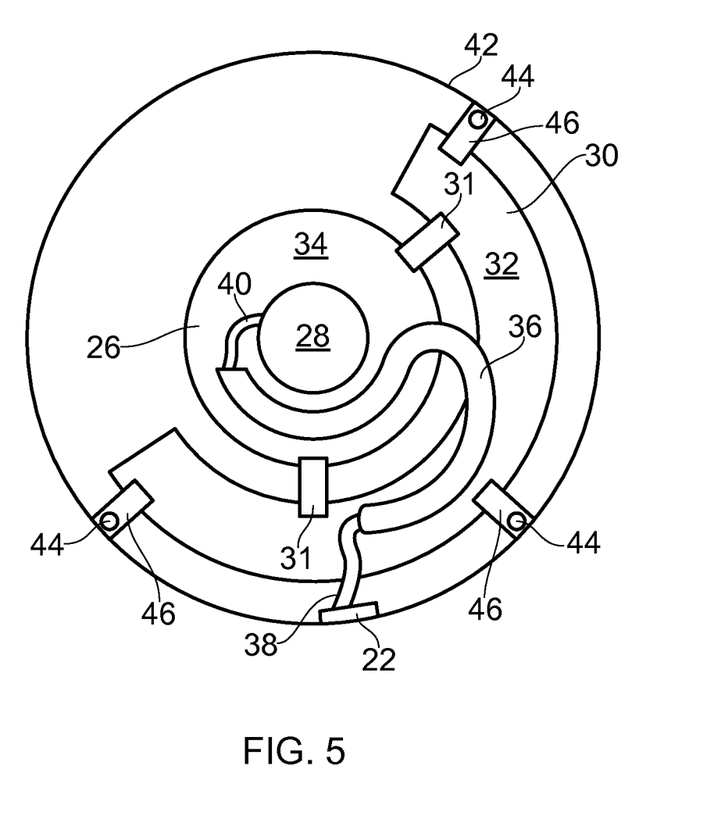
FIG. 5 is a plan view of a first modified system based on that shown in FIGS. 3 and 4.

FIG. 5 illustrates a first modified system based on that shown in FIGS. 3 and 4. The FIG. 5 system includes a cable support member 30 that extends only partially around the outside of the connector carrier 26. Such a design in useful when the amount of rotation in any one direction is restricted.

Figure 6:
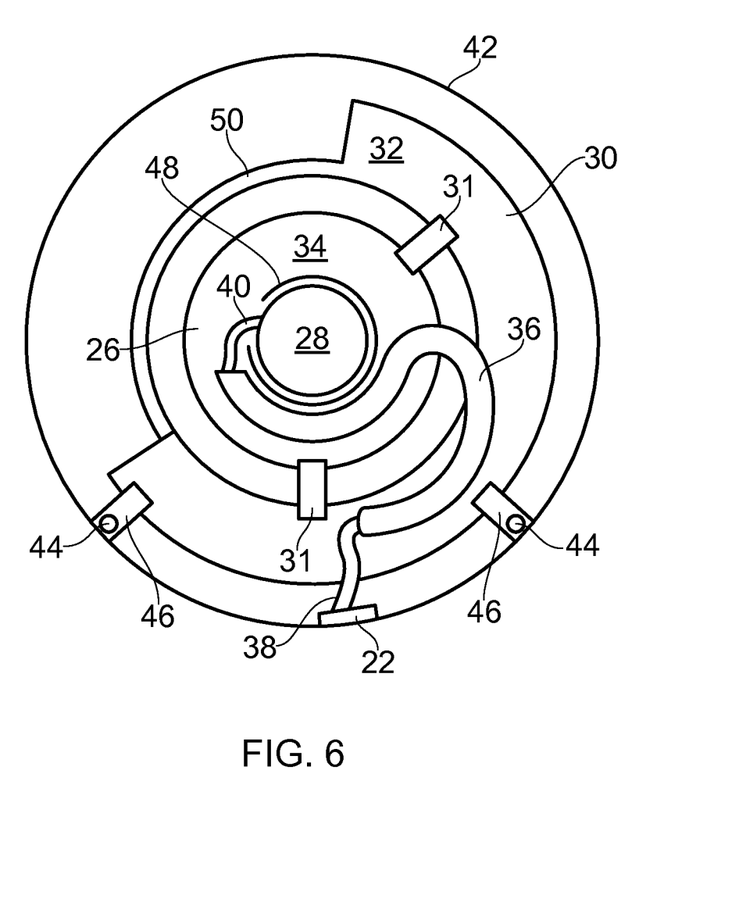
FIG. 6 is a plan view of a second modified system based on that shown in FIGS. 3 and 4.

FIG. 6 illustrates a second modified system based on that shown in FIGS. 3 and 4. In the FIG. 6 system an upstanding guide member 48 is provided on the connection carrier 26 in order to guide the chain 36 on that the second support surface 34. The guide member 48 provides the chain 36 with a substantially vertical (that is, out of the plane of the connector carrier) inner guide surface. In addition, the first support surface 32 of the cable carrier 30 does not extend fully around the connector carrier 26. A guide member 50 around the remainder of the connector carrier 26, and provides the chain 36 with an outer substantially vertical guide surface.

Figure 7:
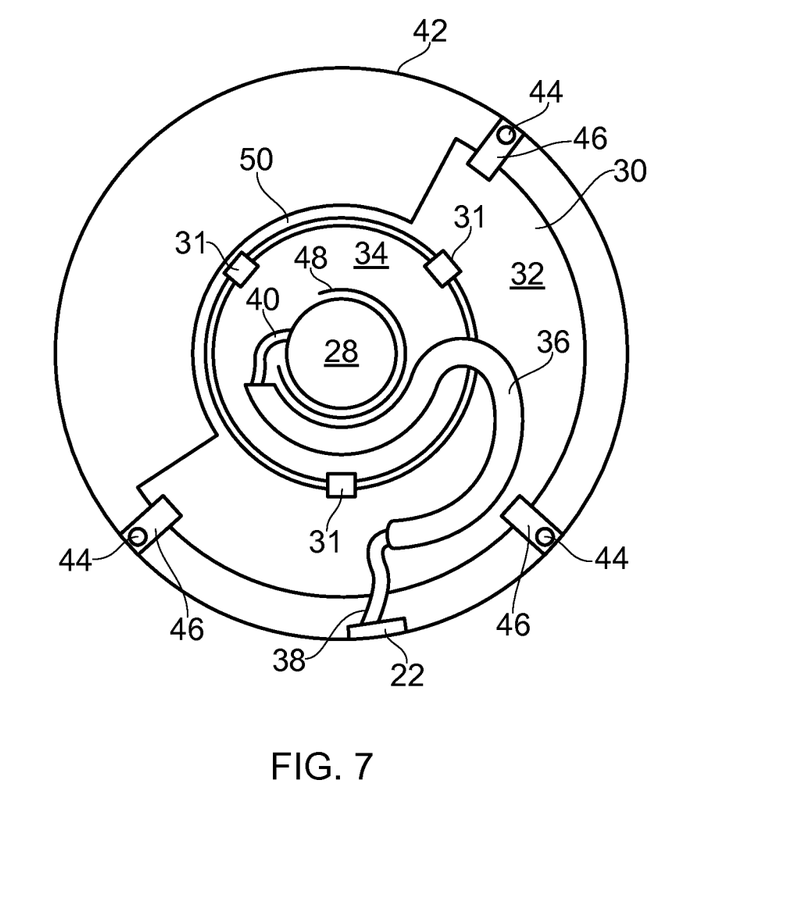
FIG. 7 is a plan view of the third modified system based on that shown in FIGS. 3 and 4.

FIG. 7 illustrates a third modified system based on that shown in FIGS. 3 and 4, in which the cable carrier is of the same general configuration as in FIG. 6, but is closer to the connector carrier 26. It is to be noted that none of the drawings are to scale.

Figure 8:
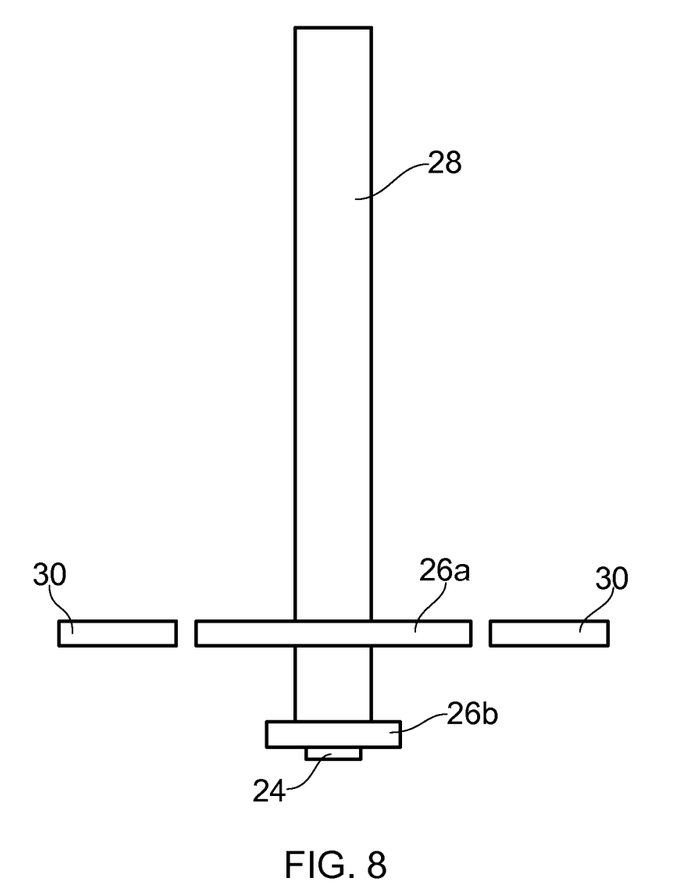
FIG. 8 shows a partial view of a fourth modified system based on that shown in FIGS. 3 and 4.

FIG. 8 is a partial side view of a modified system based on that of FIGS. 3 and 4. In FIG. 8, only the shaft 28, connector carrier 26 (26a and 26b), second connection point 24 and cable carrier 30 are shown for the sake of clarity. It will be readily appreciated that these parts are applied to the overall system as shown in FIGS. 3 and 4. In the FIG. 8 design, the connector carrier 26 is split into two separate components. A first component 26a provides the second support surface, and a second component 26b carries the second connection point 24.

The cable carrier 30 and connector carrier 26 may be provided with a selectively-actuated locking mechanism that prevents relative rotation between those two components. In addition, one or both of the cable carrier 30 and the connector carrier 26 may be provided with a sensor or other detection device to determine a maximum amount of relative rotation of the cable carrier 30 and the connector carrier 26.

Either or both of the cable carrier and connector carrier may be provided with protective wear pads to prevent wear on the basic structure. In addition, the cable carrier and/or the connector carrier may have one or more holes defined therethrough in order to moderate any build-up of unwanted material on the support surfaces.

The invention claimed is:

1. A connection system for connecting a first connection point with a second connection point, the second connection point being arranged for rotation and translation with respect to the first connection point, the connection system comprising:
a first connector disposed at a first connection point;
a housing;
a first support surface disposed within the housing and linearly spaced from the first connection point, the first support surface moveable linearly along guide structures within the housing with respect to the first connection point,
a second support surface moveable linearly and rotationally with respect to the first connection point, the second support surface connected to the first support surface in a manner so as to be moveable rotationally but not linearly with respect to the first support surface;
a second connector configured on the second support surface and defining a second connection point that is moveable linearly and rotationally with respect to the first connection point, and moveable rotationally with respect to the first support surface, and fixed with respect to the second support surface;
a reverse bend radius cable chain located on the first and second support surfaces, and having a first end connected with the first connection point via a first connector cable, and a second end connected with the second connection point via a second connector cable;
a cable carrier having a surface which provides the first support surface, and a substantially circular member having a surface which provides the second support surface, wherein the substantially circular member is arranged radially inside the cable carrier such that the first support surface is adjacent the second support surface, and wherein the cable carrier is attached to the substantially circular member with attachment devices disposed between an outer edge of the second support surface and an inner radial edge of the cable carrier, the attachment devices configured such that linear movement between the cable carrier and substantially circular member is substantially prevented, and such that the substantially circular member is rotatable with respect to the cable carrier;
wherein the guide structures comprise at least one guide rail located on an inner surface of the housing, and at least one guide member associated with each guide rail, each guide member being arranged to attach the cable carrier with the guide rail.

2. A connection system as claimed in claim 1, wherein the cable carrier is provided by a substantially annular member.

3. A connection system as claimed in claim 1, wherein the cable carrier extends only partially around the substantially circular member.

4. A connection system as claimed in claim 1, wherein the first support surface extends only partially around the second support surface.

5. A connection system as claimed in claim 1, wherein the second connection point is mounted on the substantially circular member.

6. A connection system as claimed in claim 1, wherein the cable carrier and substantially circular member are located in the housing, the cable carrier being attached to the housing to allow linear movement of the cable carrier along the guide structures with respect to the housing and substantially to prevent rotational movement of the cable carrier with respect to the housing.

7. A connection system as claimed in claim 6, wherein the guide structures comprise at least one elongate guide portion which extends from the housing and which slidably engages with a guide aperture in the cable carrier.

8. A connection system as claimed in claim 1, wherein the first connection point provides a functional connection.

9. A connection system as claimed in claim 1, wherein the first connection point provides a physical connection.

10. A connection system as claimed in claim 1, wherein the second connection point provides a functional connection.

11. A connection system as claimed in claim 1, wherein the second connection point provides a physical connection.

12. An underwater power generating device comprising a connection system for connecting a first connection point with a second connection point, the second connection point being arranged for rotation and translation with respect to the first connection point, the connection system comprising:
a first connector disposed at a first connection point;
a housing;

a first support surface disposed within the housing and linearly spaced from the first connection point, the first support surface moveable linearly along guide members within the housing with respect to the first connection point, a second support surface moveable linearly and rotationally with respect to the first connection point, the second support surface connected to the first support surface in a manner so as to be moveable rotationally but not linearly with respect to the first support surface;

a second connector configured on the second support surface and defining a second connection point that is moveable linearly and rotationally with respect to the first connection point, and moveable rotationally with respect to the first support surface, and fixed with respect to the second support surface;

a reverse bend radius cable chain located on the first and second support surfaces, and having a first end connected with the first connection point via a first connector cable, and a second end connected with the second connection point via a second connector cable;

a cable carrier having a surface which provides the first support surface, and a substantially circular member having a surface which provides the second support surface, wherein the substantially circular member is arranged radially inside the cable carrier such that the first support surface is adjacent the second support surface, and wherein the cable carrier is attached to the substantially circular member with attachment devices disposed between an outer edge of the second support surface and an inner radial edge of the cable carrier, the attachment devices configured such that linear movement between the cable carrier and substantially circular member is substantially prevented, and such that the substantially circular member is rotatable with respect to the cable carrier;

wherein the guide structures comprise at least one guide rail located on an inner surface of the housing, and at lease one guide member associated with each guide rail, each guide member being arranged to attach the cable carrier with the guide rail.

13. An underwater power generating device as claimed in claim 12, further comprising a support structure for location on the bed of a body of water, and a power generating unit adapted for mounting on the support structure the power generating unit being adapted for rotation with respect to the support structure, the connection system being arranged to provide at least one connection between equipment of the support structure and equipment of the power generating unit.

14. An underwater power generating device as claimed in claim 12, further comprising a support structure for location on the bed of a body of water, and a power generating unit adapted for mounting on the support structure, the power generating unit being adapted for rotation with respect to the support structure, the connection system being arranged to provide at least one connection between equipment of the support structure and equipment of the power generating unit, and an engagement system adapted to enable the power generating unit to be rotated with respect to the support structure and detached from the support structure, the connection system being located substantially within the engagement system.

* * * * *